July 15, 1947. T. B. DILWORTH ET AL 2,423,929
LOCOMOTIVE COOLING SYSTEM
Filed Oct. 5, 1945 2 Sheets-Sheet 1
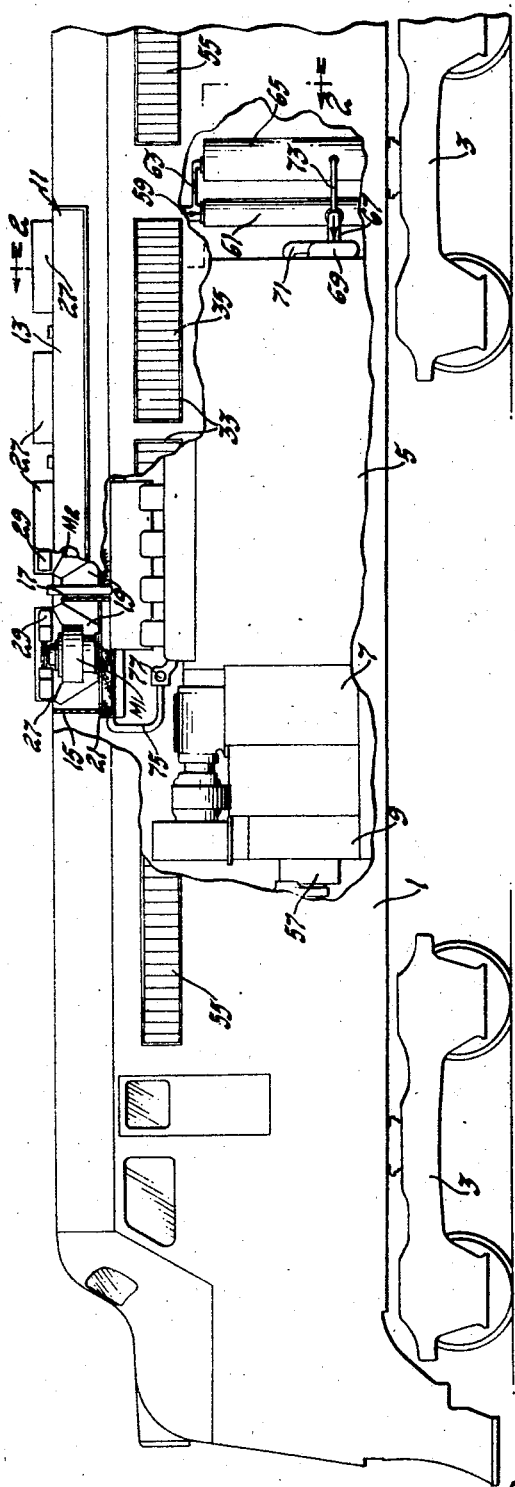
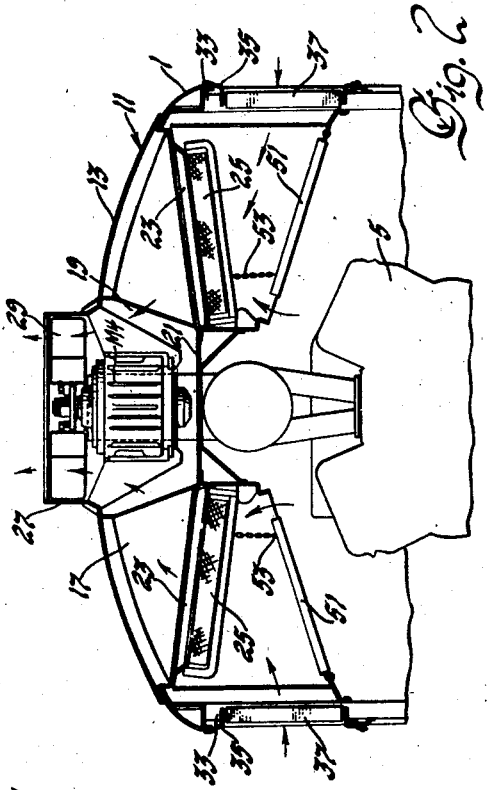
Inventors
Thomas B. Dilworth &
Milo M. Schalla Inventors
Thomas B. Dilworth &
Milo M. Schalla
By Blackmore, Spencer & Flint
Attorneys Patented July 15, 1947

2,423,929

UNITED STATES PATENT OFFICE 2,423,929

LOCOMOTIVE COOLING SYSTEM

Thomas B. Dilworth, Hinsdale, and Milo M. Schalla, Oak Lawn, Ill., assignors to General Motors Corporation, Detroit, Mich., a corporation of Delaware Application October 5, 1945, Serial No. 620,582

6 Claims. (Cl. 105—35)

The present invention relates to generating electric locomotive cooling systems of the temperature responsive type.

The principal object of this invention is to provide a simple automatic locomotive cooling system including a plurality of engine cooling radiators, radiator shutters and motor driven cooling fans adapted to operate at a speed proportional to that of the engine and engine temperature responsive means for causing opening of the shutters and starting of the motors in different sequence each time the engine warms up and for causing simultaneous closure of the shutters and shut down of the fan motors when the engine cools down so that the engine operates within the most efficient operating temperature range for wide variations in load, ambient temperature and head, side and tail winds encountered by the locomotive.

The combination and arrangement of means by which the above object is accomplished will become apparent by reference to the following detailed description and drawings illustrating one combination of cooling and control means which is particularly adapted for generating electric locomotives.

Figure 1 of the drawings is a vertical elevation view of a locomotive with parts broken away to show the arrangement of certain of the engine cooling and control means to good advantage.

Figure 2 is a cross sectional elevation view taken on line 2—2 of Figure 1.

Figures 3, 4:
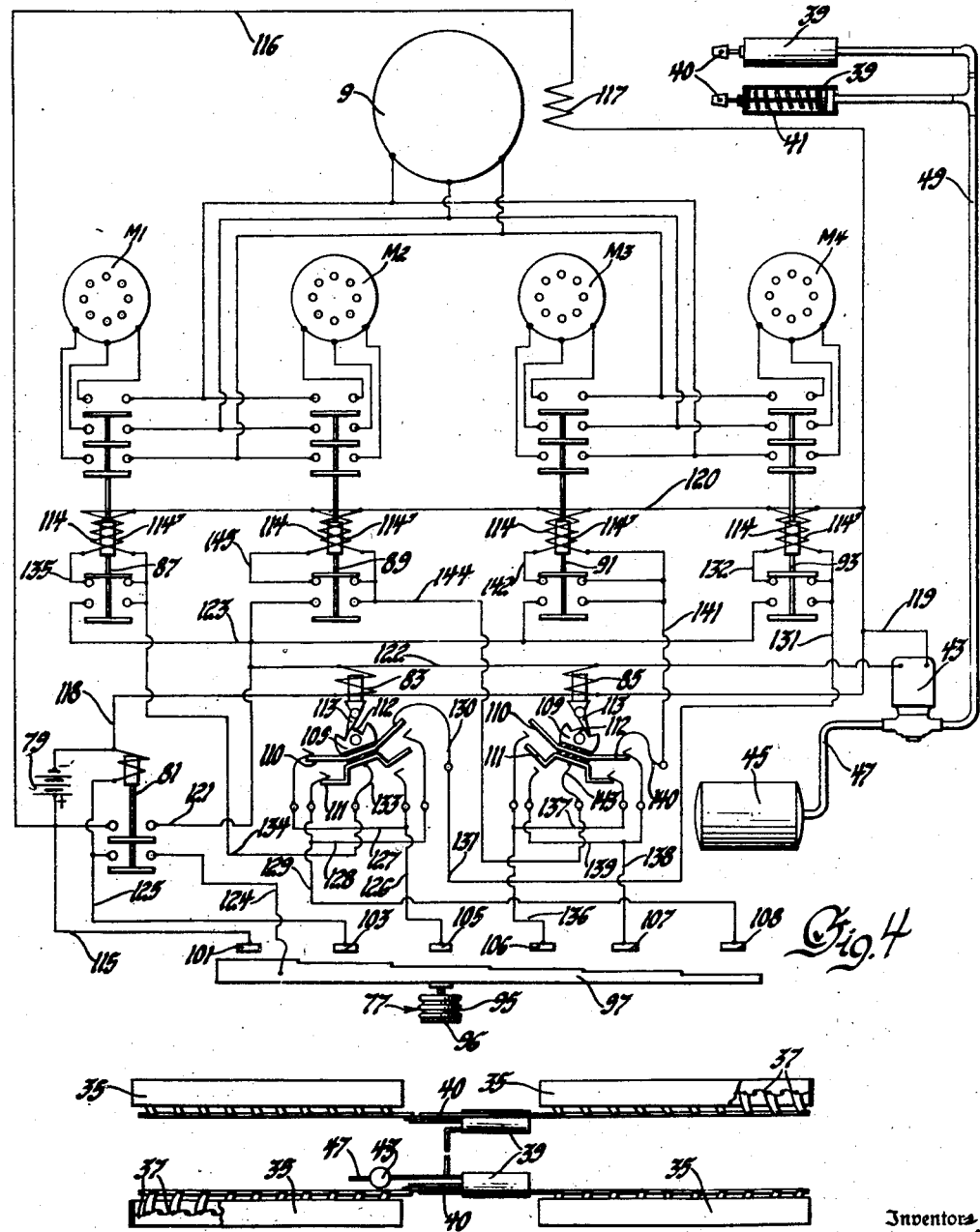
Figure 3 is a schematic view of the operating means for and details of the shutters for controlling the engine cooling radiator air.
Figure 4 is a schematic view and wiring diagram of the electric cooling fan drive and temperature responsive control means for the fan motors and radiator shutter operating means.

As best illustrated in Figure 1 the locomotive comprises a cab 1 supported on two multi-axle articulated traction trucks 3. The power generating unit located within the cab includes an internal combustion engine 5 directly connected to an electric traction generator 7 for supplying power to the traction motors, not shown, driving the axles of the trucks 3. A three phase alternator 9 is directly connected to the traction generator 7 for supplying power at frequencies proportional to the engine speed.

A service opening is provided in the arcuate roof of the cab 1 above the engine 5 and a sheet metal hatch cover generally indicated at 11 covers this opening as best illustrated in Figures 1 and 2. The hatch cover includes an arcuate roof portion 13, vertical transverse end walls 15 and vertical transverse partitions 17 spaced longitudinally therebetween to form four separate transverse exhaust air ducts 19 and a central bottom portion 21 with longitudinal openings 23 on either side thereof. Engine cooling radiators 25 are secured over these openings to the lower edges of the end walls 15 and partitions 17 of the hatch 11. A circular exhaust air stack 27 is provided in the upper central arcuate portion of each exhaust air duct 19. An exhaust fan 29 and a three phase induction motor operably connected thereto is supported by suitable brackets in each hatch exhaust duct 19 so that the fan 29 is located adjacent the exhaust stack 27. The four induction motors are indicated at M1 to M4. As best illustrated in Figure 2 when the hatch cover 11 is in place the engine cooling radiators 25 are positioned above and extend along each side of the cab 1 and engine 5 and slope upwardly and inwardly to the central bottom portion 21 of the hatch cover 11. Longitudinally extending radiator air inlet openings 33 are provided in opposite sides of the cab directly below each radiator and radiator shutters 35 having overlapping shutter vanes 37 pivoted about vertical axes are provided to normally close each of the radiator air inlet openings. A pneumatic shutter cylinder 39 is secured to each cab side between the openings 33 and each cylinder is provided with a plunger 40 which is connected to the shutter vanes 37 adjacent thereto by suitable links and levers as shown in Figure 3. Each of these cylinders 39 also includes a plunger retracting spring 41 to normally urge the shutter vanes 37 to the closed position as best shown in Figures 3 and 4. An electro-pneumatic shutter control valve 43 is connected between an air pressure reservoir 45 and the shutter cylinders by pipes 47 and 49. The shutter valve 43 when deenergized relieves the pressure in the cylinders 39 so the plunger retracting springs 41 cause closure of the shutter vanes 37. When the shutter valve 43 is energized air pressure is applied to the shutter cylinders 39 and plungers 40 from the reservoir 45 to cause opening of the shutter vanes 37.

A longitudinal air baffle 51 is hinged along the lower edge of the radiator inlet air openings 33 in either side of the cab 1 and chains 53 support these baffles 51 from the hatch 11 so that they slope upwardly and inwardly from the cab sides toward the central bottom portion 21 of the hatch 11 leaving a small air entrance opening therebetween so that some air may be drawn from the interior of the cab 1 through the radiators 25 by the fans 29. Cab air entrance openings 55 are provided in opposite sides of the cab 1 either side of the radiator inlet cooling air openings 33 to supply induction air for the engine 5 and an engine driven air brake compressor 57 and inlet air blowers, not shown, for cooling and ventilating the electrical traction and auxiliary electrical units including the engine driven alternator 9. It will be evident with the above arrangement that when the shutters 35 are open and the fans 27 and induction motors M1, M2, M3 and M4 are operating radiator cooling air is drawn in through the radiator inlet openings 33 and radiators 25 into the hatch exhaust ducts 19 and exhausted outwardly therefrom by the exhaust fans 29 through the upper central exhaust air stacks 27 therein.

A radiator water outlet manifold 59 is connected between the outside lower corners of the radiators 25 at one end thereof and the upper portion of an engine oil cooler 61. A small diameter branch pipe 63 is connected between the manifold 59 and the upper portion of a water storage and make-up tank 65. The lower end of the engine oil cooler 61 is connected to an inlet pipe 67 of an engine driven water cooling pump 69, the outlet pipe 71 of which is connected to the coolant space around the cylinders and cylinder heads of the engine 5. The lower end of the tank 65 is connected by a small diameter branch pipe 73 to the pump inlet pipe 67. The engine 1 is provided with an upper engine outlet water manifold 75, including temperature responsive switching mechanism, generally indicated at 77 in Figures 1 and 4. The manifold 75 is connected to the upper outer corners of the engine cooling radiators at the opposite ends thereof. The level of the water in the engine cooling system including the oil cooler 61 and storage tank 65 is normally maintained at a height slightly above the coolant space around the engine cylinder heads when the engine 5 and cooling pump 69 is stopped. When the engine 5 and pump 69 is operating water is circulated thereby longitudinally through the radiators 25 and back through the engine oil cooler 61 to the pump 69 and to and through the engine 5 as this is the path of least water flow resistance, however some water passes from the radiators 25 through the higher flow resistance path to the pump 69 through the tank 65 and smaller diameter branch pipes 63 and 73 which connect the storage and make-up tank 65 in parallel with the oil cooler 61. With the above described piping system when the engine 5 and cooling pump 69 is stopped the water in the radiators 25 drains downwardly into the engine coolant space and engine oil cooler 61 and storage tank 65 to the normal level thereby eliminating the danger of freezing and damage to the radiators in cold weather.

The cooling air drawn through the radiators 25 by operation of three of the four motor driven fans 29 is sufficient to prevent overheating of the engine in hot weather when operating under full load and operation of all four fans 29 prevents engine overheating under extreme high ambient temperature conditions such as encountered in tunnels when the engine is operating at full load and the Diesel locomotive unit is operated behind a steam locomotive or in multiple behind similar units. As previously explained the radiator inlet air shutters 35 are opened and the fan driving motors M1—M4 are caused to operate in different sequence each time the engine warms up. The shutters are caused to open at the lowest value of temperature in the temperature range in which the engine operates efficiently and the shutters are closed and all of the fans are shut down when the engine temperature falls below this lower value of temperature in response to action of the temperature responsive switching means 77 located in the engine outlet water manifold 75.

As best illustrated in Figure 4 the temperature responsive switching means 77 is included in a control circuit which includes the electropneumatic shutter valve 43, a battery 79, a current relay 81, sequence relays 83 and 85 of identical form and fan motor contactors 87, 89, 91 and 93 which are also of identical form and connected by power conductors, shown in heavy lines, between the engine driven alternator 9 and each of the induction motors M1 to M4 driving the exhaust cooling fans 29 for controlling operation of the fans and shutters in the above described manner.

The engine temperature switching means 77, as best illustrated diagrammatically in Figure 4, includes a thermally expansible element 95 secured at one end to a stationary member 96 in the engine outlet water manifold 75 and having a stepped contact bar 97 secured to the other end of the element and movable thereby upon warm-up of the engine into contact successively with a plurality of fixed contacts 101, 103, 105, 106, 107 and 108 of the switch mechanism.

The current relay 81 includes two pairs of fixed contacts, an armature having contacts cooperating therewith and a contactor winding which when energized causes upward movement of the armature contacts from the normal position as shown.

The sequence relays 83 and 85 are provided with a contact lever 109 carrying two contact bars 110—111 and pivoted at its center and having an upstanding central finger 112 with notches on either side thereof and an armature and armature winding which when deenergized causes the armature to drop to the position shown. A pawl 113 is pivoted on the lower end of the armature and when the armature falls the pawl engages one or the other of the sides of the upstanding central finger 112 of the contact lever 109 depending upon which way it is tilted, and enters one or the other of the notches adjacent the finger to cause the contact lever to be tilted in the opposite direction. When the contact lever 109 is in the position shown each of the contact bars 110—111 thereon contacts a separate contact finger of a pair located adjacent one end of the contact lever. Energization of the winding causes the armature to be pulled up and the pawl 113 pivoted thereon accordingly assumes a vertical position. When the winding is next deenergized the armature and pawl falls and the upstanding control finger 112 of the contact lever 109 guides the pawl into whichever lever notch that is rocked upwardly so that the weight of the falling armature and pawl causes the contact lever to be tilted in the opposite direction. This causes each of the contact bars 110—111 of the contact lever 109 to be rocked to the opposite position into contact with one contact finger of another pair of fingers located adjacent the other end of the contact lever.

The motor contactors 87, 89, 91 and 93 are provided with three pairs of fixed power contacts each pair of which is connected by power conductors, shown in heavy lines, between one of the three phase terminals of the engine driven alternator 9 and one of the fan driving induction motors M1—M4. The contactors are also provided with two pairs of fixed lower interlocking contacts and an armature having power and interlocking contacts is moved upwardly to the motor operating position from the normal position shown upon energization of contactor windings 114 and 114'. The winding 114' serves as a holding winding and is energized to hold the armature in the motor operating position.

The following battery excitation, control and interlocking connections are shown extending between the battery, temperature responsive switching means, contactors, relays and electropneumatic shutter valve.

The positive terminal of the battery 79 is connected by positive conductors 115—116 to one terminal of an excitation winding 117 of the alternator 9, the fixed contact 101 of the temperature responsive switching means 77 and one of the upper normally open pair of fixed contacts of the current relay 81. The negative battery terminal is connected by negative return conductors 118, 119 and 120 to the other winding terminal of the alternator excitation winding 117, one terminal of each of the relays and contactors and one winding terminal of the electropneumatic shutter valve 43. The other upper fixed contact of the current relay 81 is connected by conductors 121, 122 and 123 to the other winding terminals of the sequence relays 83 and 85 and the shutter valve 43 and also to one of the lower normally open pair of fixed interlocking contacts of each of the motor contactors 87, 89, 91 and 93.

The stepped contact bar 97 of the temperature responsive switching means 77 is connected by a flexible conductor 124 to one of the lower pair of fixed contacts of the current relay 81 and the other contact of this pair is connected to a conductor 125 which is connected between the other winding terminal of the relay 81 and the fixed contact 103 of the temperature responsive switching means 77.

The fixed contact 105 of the switching means is connected by a conductor 126 to a conductor 127 interconnecting the upper left and lower right contact fingers of the sequence relay 83. The upper right and lower left contact fingers of the relay 83 are interconnected by a conductor 128 which is connected by a conductor 129 to the fixed contact 108 of the switching means. The upper contact bar 110 of the relay 83 is connected by a flexible conductor 130 and a conductor 131 to the right-hand fixed interlocking contacts and the other terminal of the holding winding 114' of the motor contactor 93. The other fixed interlocking contact of the normally closed upper pair of the contactor 93 is connected by a conductor 132 to the other terminal of the other contactor winding 114. The lower contact bar 111 of the sequence relay 83 is connected by a flexible conductor 133 and a conductor 134 to the right-hand fixed interlocking contacts and other terminal of the holding winding 114' of the motor contactor 87. The other fixed interlocking contact of the normally closed upper pair of the contactor 87 is connected by a conductor 135 to the other terminal of the other winding 114 thereof.

The fixed contact 106 of the temperature responsive switching means 77 is connected by a conductor 136 to a conductor 137 interconnecting the left upper and right lower contact fingers of the sequence relay 85. The fixed contact 107 of the switching means 77 is connected by a conductor 138 to a conductor 139 interconnecting the left lower and right upper contact fingers of the sequence relay 85. The upper contact bar 110 of the relay 85 is connected by a flexible conductor 140 and a conductor 141 to the right-hand fixed interlocking contacts and other terminal of the holding winding 114' of the motor contactor 91, the fixed upper left interlocking contact of which is connected by a conductor 142 to the other terminal of the other holding winding 114 of the contactor 91. The lower contact bar 111 is connected by a flexible conductor 143 and a conductor 144 to the right-hand fixed interlocking contacts of the contactor 89, the fixed upper left-hand interlocking contact of which is connected by a conductor 145 to the other terminal of the other winding 114 thereof.

As previously explained when the engine 5 is stopped and cold the water in the radiators 25 has drained back into the engine coolant space, oil cooler 61 and water storage and make-up tank 65 to the normal level slightly above the coolant space around the engine cylinder coolant space and the temperature responsive switching means, relays and fan motor contacts are in the position shown so that the radiator inlet air shutters 35 are closed and the fan motors M1—M4 are stopped. The excitation winding 117 of the alternator 9 is energized as it is connected across the battery 79 by conductors 116 and 118.

When the engine 5 is started the engine driven cooling pump 69 causes circulation of cooling water through the engine coolant space, radiators 25 and oil cooler 61 and some water, as explained, is circulated through the tank 65. When the traction generator 7 driven by the engine 5 is supplying full load current to the traction motors and the engine is operating at maximum speed the output frequency of the engine driven alternator is proportional to the engine speed.

Upon an increase in the temperature of the cooling water circulating in the engine outlet manifold 75 to a given value slightly below the minimum value in the temperature range in which efficient operation of the engine occurs, the thermally expansible element 95 of the temperature responsive switching means 77 expands and causes the stepped contact bar 97 to move into contact with the fixed contact 101 of the switching means. This sets up a holding circuit for the winding of the current relay 81 through conductors 115 and 124. Warm-up of the engine cooling water to the minimum value in the temperature range for efficient engine operation causes the stepped contact bar 97 to next be also moved by the expansible element 95 into contact with the fixed contact 103 of the switching means 77. This bridging of the fixed contacts 101 and 103 by the stepped contact bar 97 of the switching means 77 completes an energizing circuit through conductors 115, 125 and 118 and the winding of the current relay 81 to cause upward movement of the relay armature contacts into bridging contact with the fixed relay contacts. Bridging of the upper fixed contacts of the current relay 81 completes a circuit through conductors 118, 121, 122, 119 and 118 and windings of the sequence relays 83 and 85 and the winding of the electro-pneumatic shutter control valve to cause upward movement of the sequence relay armatures and pawls 113 pivoted thereon and the opening of the shutter control valve to cause air pressure from the reservoir 45 to flow through the valve and pipes 47 and 49 to the shutter control cylinders 39 and cause the plungers 40 therein to move outwardly thereof against the force of the plunger retracting springs 41 and cause opening of the radiator air inlet shutter vanes 37. A holding circuit comprising conductors 121 and 123 is also set up to the left lower fixed interlocking contacts of the motor contactors 87, 89, 91 and 93 by the bridging of the upper fixed contacts of the current relay 81. The bridging of the lower fixed contacts of the current relay completes the holding circuit comprising the conductors 115 and 125 to the winding of the current relay 81 previously set up by contact between the fixed contact 101 and stepped contact bar 97 of the switching means and the negative return conductor 118 connected to the return terminal of the relay winding.

A slightly higher value of engine outlet water temperature causes the stepped contact bar 97 of the switching means to then also be moved into contact with the fixed contact 105 thereof. This bridging of the fixed contacts 101 and 105 completes an energizing circuit through both windings 114 and 114' of the motor contactor 93 to cause upward movement of the armature thereof. This energizing circuit includes the left upper contact finger and upper contact bar 110 of the sequence relay 85, which are in contact, and the normally closed upper fixed interlocking contacts of the motor contactor 93 and conductors 126, 127, 130, 131, 132 and return conductor 118. Initial upward movement of the armature of the contactor 93 causes the opening of the upper fixed interlocking contacts to break the energizing circuit through the conductor 132 and contactor winding 114 and full upward movement of the contactor armature causes simultaneous closure of the three phase fixed power contacts to cause energization and the starting of the induction motor M4 and the closure of the lower fixed interlocking contacts of the contactor 93 which completes the holding circuit comprising conductors 121 and 123 set up by closure of the upper contacts of the current relay 81 to the holding winding 114' of the contactor and the return conductor 118 connected thereto. Starting and operation of the induction motor M4 supplied from the engine driven alternator causes it to drive its fan at a speed proportional to the engine and draw air through substantially one-fourth of each cooling radiator.

Should the engine water outlet temperature increase to a slightly higher value the stepped contact bar 97 of the switching means will also be moved by the thermal element 95 into contact with the fixed contact 106 of the switching means. This completes a similar energizing circuit to the windings 114 and 114' of the motor contactor 89 controlling operation of the fan motor M2 through the right-hand finger and upper contact bar 110 of the sequence relay 85 which are in contact and the normally closed upper interlocking contacts and conductors 136, 137, 144 and 145. This causes upward movement of the armature of the motor contactor 89 which causes closure of the power contacts and starting and operation of the motor M2 and fan driven thereby to cause cooling air to be drawn through substantially half of the radiators 25 and the opening of the upper and closure of the lower interlocking contacts to cause deenergization of the winding 114 and to maintain energization of the holding winding 114 of the contactor through the above mentioned holding circuit setup comprising conductors 121 and 123.

A slight further increase in the temperature of the engine outlet water to the normal full load engine operating temperature causes movement of the stepped contact bar 97 into contact with the fixed contact 107 by further expansion of the thermal element 95 of the switching means 77. This likewise completes a similar energizing circuit to the windings of the motor contactor 91 and upward movement of the armature thereof to cause closure of the power contacts and starting and operation of the fan motor M3 and fan driven thereby causing cooling air to then be drawn through substantially three-fourths of the radiators 25 and to cause the opening of the upper and closure of the lower interlocking contacts which causes deenergization of the winding 114 and maintains energization of the holding winding 114' of the contactor 91 through the previously set up holding circuit.

Should the temperature of the engine outlet water increase to the maximum value of temperature in the operating range due to some unusual high ambient operating temperature condition, such as operation of the locomotive unit as a following unit in a tunnel, the stepped contact bar 97 of the temperature responsive switching means 77 will then be moved into contact with the fixed contact 108 to establish an energizing circuit comprising conductors 129, 133 and 134 to the windings of the motor contactor 87 controlling the fan motor M1. This causes upward movement of the armature of the contactor 87 and the closure of the power contacts to cause the starting and operation of the fan driving motor M1 so that air is drawn through all portions of the radiators 25 to provide maximum cooling of the engine and to likewise cause the opening of the upper and closure of the lower contactor interlocking contacts to cause deenergization of the contactor winding 114 and to maintain the holding winding 114' energized. It will be noted that with the sequence relays in the position shown the fan driving motors M1 to M4 start in the following sequence; M4, M2, M3 and M1.

When the load is taken completely off the engine 5 and the temperature of the engine outlet cooling water decreases to a value below the minimum in the operating range the stepped contact bar 91 is moved by the contraction of the thermal element 95 of the switching means 77 out of contact with the fixed contacts 108, 107, 106, 105, 103 and 101 successively. This however does not cause stopping of the fan motors operating until the holding circuit of the current relay 81 is broken by movement of the stepped contact bar out of contact with the fixed contact 101. This causes deenergization of the winding and the dropping of the armature of the current relay 81 to the position shown to break the holding circuit comprising conductors 121 and 123 to the holding winding 114' of each of the motor contactors and to simultaneously break the energizing circuit comprising conductors 121 and 122 to the windings of the sequence relay 83 and 85 and the electropneumatic shutter control valve 43, to cause simultaneous stopping of all the fan motors operating and closure of the radiator air inlet shutter vanes 37. Deenergization of the windings of the sequence relays 83 and 85, as previously described, causes the dropping of the armatures and pawls pivoted thereon into contact with the opposite side of the upstanding finger 112 on the contact lever and notch adjacent thereto from the positions shown to rock the levers and contact bars 110 and 111 thereon to the opposite position from that shown so that upon the next warm-up of the engine the shutters 35 will be opened in identical manner to that described but as the contact levers of the sequence relays are rocked to the opposite positions from that shown it will be evident that the fan motors M1 to M4 will start up in the following different sequence; M1, M3, M2 and M4 and all the fan motors operating will be shut off and the shutters opened simultaneously upon the next deenergization of the winding and dropping of the armature of the current relay 81. When this occurs the windings of the sequence relays 83 and 85 are again deenergized to cause the contact levers to be tilted back to the positions shown by the dropping of the armatures and the pawls into the notch adjacent the upstanding finger as shown.

It will be evident that the electrical connections between the current relay 81 and sequence relays 83 and 85 causes the contact lever 109 of the sequence relays to be rocked to the opposite position each time the windings of the sequence relays are deenergized by deenergization of the winding and dropping of the armature of the current relay 81 by movement of the stepped contact bar 97 out of contact with the fixed contact 101 of the temperature switching means 77 each time the engine water outlet temperature drops below the lowest value in the range for efficient engine operation. This causes a different sequence of starting and operation of the fan motors each time the engine warms up to efficient operating temperature and accordingly uniform depreciation and wear of the fan driving motors takes place. Furthermore reverse tilting of the contact lever and contact bars secured thereto with the opposite pair of contact fingers of the sequence relays takes place only after the circuit including these contact bars and fingers is broken by deenergization of the current relay which makes and breaks the relay and contactor energizing circuits. Should the current relay stick in the closed position the sequence relays, electropneumatic shutter valve and motor contactors remain closed and when the engine load and speed is reduced the motor driven fans will continue to operate a lower speed to prevent overcooling of the engine. In addition to the above novel features should the radiator shutters stick or freeze in the closed position for any reason, cooling air will be drawn through the radiators by the fans from the engine cab or in reverse flow direction downwardly through the exhaust air stacks of the fans which are not operating.

We claim:

1. In combination, an engine having a coolant space, a radiator connected with the coolant space to provide a coolant circulating circuit, a plurality of fans adjacent the radiator causing air flow through different portions of the radiator, fan driving means including an engine driven alternator and separate induction motors driving individual fans, power connections including separate switching means for connecting each fan motor to the alternator for operation at a speed proportional thereto and fan motor control means including means acting in response to different predetermined values of engine coolant temperatures above a predetermined value for efficient operation of the engine and relays connected therewith and controlled thereby for causing sequential closing of the separate fan motor switching means upon an increase in the temperature of the circulating coolant above said minimum value in order to cause sequential starting and operation of the fan motors and for causing simultaneous operating of the switching means upon a decrease in the temperature of the coolant below said minimum value in order to cause simultaneous shut down of the fan motors operating.

2. In combination, an engine having a coolant space and a coolant circulating pump driven thereby, a radiator connected to the engine coolant space to provide a coolant circulating circuit, a radiator shutter having normally closed vanes to block air flow therethrough, power means for opening the shutter vanes, a plurality of fans for causing air flow through different portions of the radiator upon opening of the radiator shutter vanes, an induction motor for driving each fan, an engine driven alternator, power connections including separate fan motor switching means to cause operation of the fan driving motors at a speed proportional to the engine driven alternator and control means including engine coolant temperature responsive means and sequence relays connected therewith for controlling the power means and fan motor switching means to cause opening of the shutter vanes and different sequential operation of the fan driving motors each time the temperature of the engine coolant increases above a predetermined value and for causing simultaneous closure of the shutter vanes and shut down of the fan driving motors operating each time the temperature of the engine coolant decreases below said predetermined value.

3. In combination, an engine having a coolant space, a coolant circulating pump driven thereby, an engine oil cooler, a coolant storage and make-up tank, a coolant radiator located above the engine, oil cooler and tank, means for connecting the engine radiator and oil cooler in a low resistance series coolant flow relation and means for connecting the storage and make-up tank in high resistance parallel coolant path with the oil cooler whereby upon stopping of the engine and circulation of the coolant the coolant in the radiator drains downwardly therefrom, a radiator air shutter having normally closed vanes to prevent air flow therethrough, power means for opening the shutter vanes, a plurality of fans for causing flow of air through different portions of the radiator, fan driving means including an engine driven alternator, separated induction motors for driving individual fans and power connections including separate fan motor switching means for connecting the engine driven alternator with one or more fan motors to cause operation of the fans at a speed proportional to the engine and shutter and fan motor control means including means acting in response to the temperature of the engine coolant and relays connected therewith to cause sequential operation of the shutter power means and motor switching means to cause opening of the shutter vanes and different starting and operating sequence of the fan motors each time the coolant of the engine increases above a predetermined value and to cause simultaneous closure of the shutter vanes and shut down of the fan motors when the temperature of the engine coolant decreases below said predetermined value.

4. In a generating electric locomotive, a locomotive cab, a generating electric power plant therein including an engine having a coolant space, a coolant circulating pump driven thereby and a traction generator and alternator driven by the engine, said cab having a roof opening, a hatch covering said roof opening and including a coolant radiator connected to the engine coolant space to provide a coolant circulating circuit, a plurality of exhaust air openings in the hatch above the radiator, an exhaust fan adjacent each opening for causing air flow through a portion of the radiator, an induction motor driving each fan, said cab having inlet air openings in the sides, some of which are located below the radiator to serve as radiator inlet air openings, a baffle on the cab side for directing air upwardly to the radiator from the radiator air inlet openings, shutters having vanes normally closing the radiator air inlet openings, power means for opening the shutter vanes, separate power connecting means for connecting each fan motor to the engine driven alternator to cause air to be drawn through a different portion of the radiator, and control means for the power operated shutter vane opening means and the fan motor connecting means including interconnected engine coolant temperature responsive control means and sequence control relays for causing opening of the radiator shutter vanes and starting and operation of the fan motors in different sequence each time the temperature of the engine coolant increases above a predetermined minimum value, and for causing simultaneous closure of the shutter vanes and shut down of the fan motors upon a decrease in the engine coolant temperature below said predetermined minimum value.

5. In a generating electric locomotive, a locomotive cab having a roof opening and side openings below the roof openings and at either end, a locomotive power plant in the cab below the roof opening, said power plant including an engine having a coolant space and an engine driven coolant circulating pump, a traction generator and an alternator driven by the engine, a hatch cover for the roof opening in the cab, said hatch cover having longitudinal bottom openings along each side, transverse end walls and partitions forming air ducts and exhaust stack in the roof portion of each duct, engine coolant radiators closing the longitudinal openings, and an exhaust fan and fan driving motors of the induction type supported in each hatch opening, operation of certain of said fans by the fan driving motors providing cooling air for the radiators to take care of normal full load speed conditions of the engine, shutters having normally closed vanes blocking entrance of air through the cab side openings below the radiators, power means for opening the shutter vanes, separate power connecting and switching means between each fan motor and the engine driven alternator and control means including engine coolant temperature responsive means, sequence and control relays connected to the shutter power means and fan motor switching means to cause opening of the shutter vanes followed by sequential starting and operation of the fan motors at a speed proportional to the engine driven alternator upon an increase in the temperature of the engine coolant above a minimum value for efficient engine operation and for also causing simultaneous closure of the shutter vanes, shut down of the motors operating and operation of the sequence relays to change the subsequent starting and operation sequence of the fan motors.

6. A cooling system for a generating electric power plant including an engine having a coolant space, an alternating current generator driven by the engine, a power plant hatch cover including a radiator connected to the engine coolant space, a plurality of radiator cooling fans for causing air flow through the radiator, an induction motor driving each fan, power connections and individual contactors for each fan motor for causing each motor to be connected to the engine driven alternator so that the fans are operated by the motors at a speed proportional to the engine and control means for the motor contactors and including a source of current, a current relay, sequence relays and switching means operable at predetermined temperature values of the engine coolant above a given minimum engine operating value so that upon energization and operation of the relays the motor contactors are energized in sequence to cause sequential operation of the fan motors and upon deenergization of the relays by a decrease in the engine coolant below said minimum value the motor contactors are simultaneously deenergized to cause simultaneous shut down of the fan motors and the sequence relays when deenergized operate and set up different energizing connections to the motor contactors whereby a different starting and operating sequence of the fan motors takes place each time the engine coolant exceeds said minimum temperature value.

THOMAS B. DILWORTH.
MILO M. SCHALLA.